Patented Jan. 16, 1951

2,538,109

UNITED STATES PATENT OFFICE 2,538,109

REDUCTION OF 12-KETOSTEROIDS TO 12-HYDROXYSTEROIDS

James S. Lawhead, Carthage, Mo., Ralph Mozingo, Minneapolis, Minn., and Jacob van de Kamp, Westfield, N. J., assignors to Merck & Co., Inc., Rahway, N. J., a corporation of New Jersey No Drawing. Application November 20, 1948, Serial No. 61,314

7 Claims. (Cl. 260—397.1)

This invention relates generally to the preparation of steroid compounds; more particularly it relates to the preparation of esters of 3-hydroxy-12-alkoxy-$\Delta^{9,11}$-cholenic acid. These compounds are useful as intermediates in the preparation of dehydrocorticosterone, Kendall's compound E and similar substances.

It has been proposed to prepare esters of 3-hydroxy-12-alkoxy-$\Delta^{9,11}$-cholenic acid by a catalytic reduction of esters of 3-hydroxy-$\Delta^{9,11}$-12-keto cholenic acid followed by a treatment with alcoholic hydrogen chloride. This reduction is usually carried out in a solution of the keto cholenic acid in a mixture of glacial acetic acid and absolute ethanol, whereby 9 parts of the mixture are required for one part of cholenic acid. The hydrogenation proceeds very slowly requiring many hours for completion. It is also necessary to change the catalyst frequently since the catalyst tends to become inactive after some time. After completion of the hydrogenation, the solvents are removed and the residue treated with methanolic hydrogen chloride to form the methoxy derivative of the cholenic acid ester. This method, while capable of preparing the desired 12-methoxy derivative is very tedious requiring many procedural steps and costly ingredients.

We have now found that it is possible to prepare the esters of 3-hydroxy-$\Delta^{9,11}$-12-alkoxy cholenic acid essentially in one operation. The hydrogenation is completed in a very short time in excellent yields without change of catalyst and the preparation of the 12-alkoxy derivative can be carried out without the removal of solvents.

When carrying out the process in accordance with the invention herein disclosed, 3-hydroxy-$\Delta^{9,11}$-12-keto cholenic acid is first dissolved in a lower aliphatic alcohol, such as methanol, in the presence of a mineral acid such as hydrogen chloride. The solution is allowed to stand for several hours for conversion of the acid to the corresponding ester.

The methyl ester of 3-hydroxy-$\Delta^{9,11}$-12-keto cholenic acid is highly soluble in methanol. It is thus possible to carry out the reduction in a highly concentrated solution, for example, 3 parts of methanol to 1 part of the cholenic acid, which is a distinct advantage over the methods of prior art which required a much higher ratio.

It is also advantageous to add to the methanolic solution, prior to the hydrogenation, a minute amount of a mineral acid such as hydrogen chloride, sulfuric acid, or the like. The presence of a mineral acid speeds up the rate of the hydrogenation considerably. When carrying out the hydrogenation in accordance with our improved method, it is also unnecessary to change the catalyst as was required in the prior art methods. The methanolic solution is shaken under about 15 lbs. hydrogen pressure at room temperature. The hydrogenation proceeds smoothly and is substantially complete in about one hour. After 1 molar equivalent of hydrogen has been absorbed, there is a marked reduction of the rate of hydrogen absorption. This is an excellent indication of the completion of the reduction so that over-hydrogenation can easily be avoided.

Since the hydrogenation is a selective one involving the reduction of a carbonyl in the presence of a carbon to carbon double bond, it is essential that over-hydrogenation be avoided. The $\alpha,\beta$-unsaturated ketones are ordinarily reduced to saturated ketones rather than to unsaturated alcohols whereas our improved method produces the unsaturated alcohol in high yields.

While we have obtained excellent results with the use of platinum oxide, other hydrogenation catalysts from the noble metal group can be used. When the hydrogenation is complete the catalyst can be removed by filtration, or the like; more alcohol is added and the solution is cooled. To this solution, precooled alcoholic hydrogen chloride is added and the reaction mixture is allowed to stand for several days preferably at a low temperature, during which time the ester of 3-hydroxy-$\Delta^{9,11}$-12-alkoxy cholenic acid is deposited in crystalline form. The crystalline product can then be filtered from the mother liquid and recrystallized from methanol.

The following examples illustrate methods of carrying out the present invention, but it is to be understood that these examples are given by way of illustration and not of limitation.

Example 1

9.7 grams (0.025 mole) of 3-hydroxy-$\Delta^{9,11}$-12-ketocholenic acid (M. P. 174–176.1° C.) was dissolved in 30 cc. of methanol to which was added 0.2 cc. of aqueous concentrated hydrogen chloride. This solution was allowed to stand overnight at room temperature for conversion of the acid to the methyl ester. (The completeness of esterification was tested by taking an aliquot, diluting with benzene, removing the methanol by washing with water and extracting the benzene solution of the methyl ester with sodium bicarbonate solution. Addition of hydrochloric acid to the bicarbonate extract caused only a negligible turbidity.)

Example 2

10.05 grams of methyl $3\alpha$-hydroxy-$\Delta^{9,11}$-12-ketocholenate was dissolved in 30 cc. of methanol to which one drop of concentrated hydrochloric acid has been added. This solution was shaken in the presence of platinum oxide catalyst under a positive pressure of hydrogen gas until one molecular equivalent of hydrogen has been absorbed at which time the absorption ceases. After the catalyst has been removed by filtration the methanol solution was cooled to 0° C. and to it added an additional 5 cc. of methanol and 40 cc. of a previously cooled (0° C.) 2 normal solution of hydrogen chloride in methanol. The resulting solution was then allowed to stand at 0° C. for 72 hours. From the resulting mixture pure methyl $3\alpha$-hydroxy-$\Delta^{9,11}$-12-methoxycholenate can be recovered in a yield of 80–90% of the theoretical.

Example 3

9.7 grams of $3\alpha$-hydroxy-$\Delta^{9,11}$-12-ketocholenic acid was dissolved in 30 cc. of methanol to which one drop of concentrated aqueous hydrogen chloride has been added. This solution was shaken in presence of platinum oxide catalyst under a positive pressure of hydrogen gas until one molecular equivalent of hydrogen has been absorbed at which time the absorption ceases. After the catalyst has been removed by filtration the methanol solution was cooled to 0° C. and to it was added an additional 5 cc. of methanol and 40 cc. of a previously cooled (0° C.) 2 normal solution of hydrogen chloride in methanol. The resulting solution was then allowed to stand at 0° C. for 72 hours. From the resulting mixture pure methyl $3\alpha$-hydroxy-$\Delta^{9,11}$-12-methoxycholenate can be recovered in a yield of 90% of the theoretical.

Various changes and modifications in the foregoing procedure will occur to those versed in the art, and to the extent that such changes and modifications fall within the purview of the appended claims it will be understood that they constitute part of our invention.

We claim:

1. The process which comprises reducing the 12-keto group of an unsaturated ketosteroid to an unsaturated 12-hydroxysteroid by treating said ketosteroid with hydrogen in methanolic medium in the presence of platinum oxide and a catalytic amount of hydrochloric acid.

2. The process for the preparation of methyl 3-hydroxy-$\Delta^{9,11}$-12-methoxy cholenate which comprises reducing the 12-keto group of methyl 3-hydroxy-$\Delta^{9,11}$-12-ketocholenate by treating said compound in a methanolic solution with hydrogen in the presence of platinum oxide and a catalytic amount of hydrogen chloride, removing the catalyst, treating the resulting 12-hydroxy cholenate with methanol and hydrochloric acid and recovering methyl-3-hydroxy-$\Delta^{9,11}$-12-methoxy cholenate.

3. The process for the preparation of methyl 3-hydroxy-$\Delta^{9,11}$-12-methoxy cholenate which comprises reducing 3-hydroxy-$\Delta^{9,11}$-12-ketocholenic acid in a methanolic solution with hydrogen in the presence of platinum oxide and a catalytic amount of hydrogen chloride, removing the catalyst, treating the resulting 12-hydroxy compound with methanol and hydrochloric acid and recovering methyl 3-hydroxy-$\Delta^{9,11}$-12-methoxy cholenate.

4. The process which comprises reducing the 12-keto group of an unsaturated ketosteroid to an unsaturated 12-hydroxysteroid by treating said ketosteroid with hydrogen in methanolic medium in the presence of a platinum catalyst and a catalytic amount of a mineral acid.

5. The process which comprises reducing the 12-keto group of an alkyl 3-hydroxy-$\Delta^{9,11}$-12-ketocholenate by treating said ketosteroid with hydrogen in methanolic medium in the presence of platinum oxide and a catalytic amount of hydrochloric acid.

6. The process which comprises reducing the 12-keto group of a 3-hydroxy-$\Delta^{9,11}$-12-ketocholenic acid by treating said ketosteroid with hydrogen in methanolic medium in the presence of platinum oxide and a catalytic amount of hydrochloric acid.

7. The process for the preparation of the methyl ester of 3-hydroxy-$\Delta^{9,11}$-12-methoxy-cholenic acid which comprises, reducing the 12-keto group of methyl-3-hydroxy-$\Delta^{9,11}$-12-ketocholenate by treating said compound with hydrogen in methanolic medium and in the presence of a platinum catalyst and a catalytic amount of a mineral acid to form a 12-hydroxycholenate, removing the catalyst, treating said 12-hydroxy compound with methanol in the presence of a mineral acid and recovering methyl-3-hydroxy$\Delta^{9,11}$-12-methoxycholenate.

JAMES S. LAWHEAD.
RALPH MOZINGO.
JACOB van de KAMP.

REFERENCES CITED

The following references are of record in the file of this patent:

UNITED STATES PATENTS

| Number | Name | Date |
| --- | --- | --- |
| 2,173,425 | Ruzicka | Sept. 19, 1939 |
| 2,180,614 | Schwenk | Nov. 21, 1939 |
| 2,209,004 | Ruzicka | July 23, 1940 |
| 2,308,834 | Ruzicka | Jan. 19, 1943 |